United States Patent [19]

Chenoweth et al.

[11] 4,104,238
[45] Aug. 1, 1978

[54] SILICA-ALUMINA TRIHYDRATE FILLED EPOXY CASTINGS RESISTANT TO ARCED $SF_6$

[75] Inventors: Terrence E. Chenoweth, Monroeville; Frederick A. Yeoman, Murrysville, both of Pa.

[73] Assignee: Westinghouse Electric Corp., Pittsburgh, Pa.

[21] Appl. No.: 744,379

[22] Filed: Nov. 23, 1976

[51] Int. Cl.² .................................. C08L 63/00
[52] U.S. Cl. ..................... 260/37 EP; 200/148 G; 200/151; 252/63.5; 252/64
[58] Field of Search ................... 260/37 EP, 2 EP; 252/63 M, 64, 63.5, 63.2; 428/418

[56] References Cited

U.S. PATENT DOCUMENTS

| | | | |
|---|---|---|---|
| 3,206,330 | 9/1965 | Chottiner | 260/37 EP |
| 3,433,893 | 3/1969 | Hofmann et al. | 260/37 EP |
| 3,542,803 | 11/1970 | Porret | 260/2 EP |
| 3,629,263 | 12/1971 | Batzer et al. | 260/37 EP |
| 3,645,899 | 2/1972 | Linson | 252/63.7 |
| 4,001,128 | 1/1977 | Penneck | 252/63.2 |

Primary Examiner—Lewis T. Jacobs
Attorney, Agent, or Firm—D. P. Cillo

[57] ABSTRACT

A cured, insulating, casting composition, having a coefficient of linear thermal expansion of below about $38 \times 10^{-6}$ in./in./° C and being resistant to arced sulfur hexafluoride gas, in contact with a metal surface in a sulfur hexafluoride gas environment, is made from hydantoin epoxy resin, anhydride curing agent and a filler combination of fused silica and alumina trihydrate.

10 Claims, No Drawings

SILICA-ALUMINA TRIHYDRATE FILLED EPOXY CASTINGS RESISTANT TO ARCED SF₆

The invention herein described was made in the course of or under a contract or subcontract thereunder with the U.S. Energy Research and Development Administration (ERDA Contract E(49-18) 2061).

The Government has rights in this invention pursuant to Contract No. E(49-18)2061 awarded by the U.S. Energy Research and Development Administration.

BACKGROUND OF THE INVENTION

In about the last 10 years, a new concept for the insulation of high voltage substation power interrupting equipment and transmission lines, and potentially for long distance power transmission lines has been developed. The new concept involves insulating all components energized at high voltages by surrounding them with an atmosphere of pressurized, insulating sulfur hexafluoride gas. Insulating spacers and other components used in pressurized, $SF_6$ gas insulated high voltage transmission systems must provide a very high degree of arc and track resistance even in an arced $SF_6$ gas environment.

These spacers may be used at voltage gradients as high as 60 kV. to 120 kV. per inch. Since these spacers are used to isolate large aluminum or copper conductors from the walls of pressurized ducts, it is essential that they have linear thermal expansion coefficients closely matching those of aluminum and copper at about 22 and $18 \times 10^{-6}$ in./in./° C respectively.

Epoxy resins of the diglycidyl ether of bisphenol A type and silica fillers are known to have poor arc and track resistance in an arced $SF_6$ environment. Luck et al., in U.S. Pat. No. 3,828,000 provided a composition with improved $SF_6$ resistance, by using anhydride cured cycloaliphatic epoxy resins filled with alumina trihydrate and thickened with asbestos. These compositions, developed for coatings of thin cross section, tended however to have high coefficients of thermal expansion, and when cast in massive thickness in contact with metals, may in some instances exhibit cracking during severe thermal cycling.

Since one extremely desirable attribute of a power circuit breaker and high voltage transmission system is high reliability, what is needed in an anhydride cured epoxy resin system not only resistant to arced $SF_6$ gas but also having a coefficient of linear thermal expansion close to that of aluminum and copper.

SUMMARY OF THE INVENTION

We have found, unexpectedly, that a combination of fused silica and alumina trihydrate will provide the required $SF_6$ arc and track resistance and low coefficient of linear thermal expansion, to solve the above problems, when combined in a certain weight ratio with a particular type of epoxy resin.

In accordance with this invention, an insulating casting composition is made by admixing: (1) 100 parts of hydantoin epoxy resin with (2) about 75 parts to about 110 parts of anhydride curing agent, (3) about 0.04 part to about 1.5 parts of a promoter effective to help accelerate the cure between the epoxy and the anhydride, (4) about 100 parts to about 450 parts of fused silica and (5) about 75 parts to about 275 parts of alumina trihydrate; where the weight ratio of fused silica:alumina trihydrate is between about 0.75 to about 3.5:1.

These compositions are then cured to provide an insulation resistant to arced $SF_6$ and also having coefficients of linear thermal expansion of up to about $38 \times 10^{-6}$ in./in./° C. These cured insulating compositions are especially suitable for potting compounds and casting resins for components to be used in $SF_6$ gas insulated equipment, such as circuit breakers, and transmission systems, particularly where the insulation must contact metal materials having coefficients of linear thermal expansion of between about 10 to $35 \times 10^{-6}$ in./in./° C, such as copper or aluminum.

DESCRIPTION OF THE PREFERRED EMBODIMENTS

The useful epoxy resins that can be employed in this invention are based on hydantoin, a nitrogen-containing heterocyclic ring have the structure:

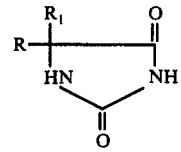

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together to form extended resins analogous in structure to bisphenol A. Polyfunctional resins can also be formed from these chain-extended materials by glycdiylization of the hydroxyls and the remaining nitrogens. These heterocyclic glycidyl amine epoxy resins can be represented by the structural formula:

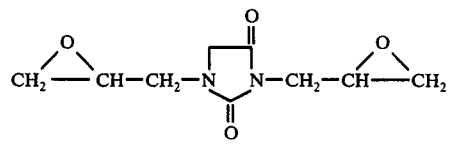

These materials are commercially available and well known in the art.

These hydantoin epoxy resins can be characterized by reference to their epoxy equivalent weight, which is defined as the mean molecular weight of the resin divided by the mean number of epoxy radicals per molecule. In the present invention, the suitale hydantoin epoxy resins will have a preferred epoxy equivalent weight of from about 100 to about 500 with a most preferred range of from about 130 to about 200. We found that cycloaliphatic epoxy resins were not effective to provide compositions having coefficients of linear thermal expansion below $38 \times 10^{-6}$ in./in./°C, and bisphenol A epoxy resins exhibited poor arc and track resistance.

The organic, carboxylic acid anhydrides reactive with the hydantoin epoxy resin, which are useful as curing agents in carrying out this invention are preferably the difunctional anhydrides. Particularly useful difunctional anhydrides are hexahydrophthalic anhydride, tetrahydrophthalic anhydride, 1-methyltetrahydrophthalic anhydride, NADIC methylanhydride, dodecenyl succinic anhydride, mixtures thereof and the like, but particularly hexahydrophthalic anhydride. The total anhydride content of the epoxy-anhydride mixture must lie within the range of from about 0.8 to about 1.2 anhydride equivalents for each epoxy equivalent.

A wide variety of well known cure promoters can be used to help accelerate cure between the epoxy and the anhydride. Useful cure promoters include quaternary phosphonium compounds, as described by Smith, in U.S. Pat. No. 3,784,583, including quaternary phosphonium compounds having the general structural formula:

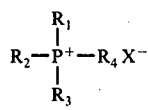

where $R_1$, $R_2$, $R_3$ and $R_4$ are aryl radicals or alkyl radicals having 1 to 21 carbon atoms with preferred alkyl radicals having 4 to 12 carbon atoms. In the above formula, X, bonded to the phosphorus is halide, propionate, acetate, butyrate, isobutyrate or dimethyl phosphate. Suitable examples would include tetrabutyl phosphonium chloride, tetrabutyl phosphonium acetate, methyltrioctyl phosphonium dimethylphosphate and methyltriphenyl phosphonium dimethylphosphate.

Other particularly effective cure promoters are organic aliphatic amines and organic aromatic amines and their mixtures, including organic imidazole amines. Examples of suitable amines include trimethylamine; triethylamine; N,N-dimethylbenzylamine; tri-n-propylamine; tri-n-butylamine; N-ethylpiperidine; N-allylpiperidine; N-ethylmorpholine; N,N-diethyl-m-toluidine; N,N-diethyl-p-toluidine, N-allylmoropholine; N,N-diethylaniline; pyridine; dimethylaminomethyl phenol; imidazole; 1-methylimidazole; 4-methylimidazole; 5-methylimidazole; 1-propylimidazole; 1,2-dimethylimidazole; 1-ethyl-2-methylimidazole; 1-phenylimidazole and the like and their mixtures. However, any cure promoter effective to accelerate cure between the hydantoin epoxy resin and the anhydride would be useful in the arc and track resistant casting composition of this invention.

The useful filler, to improve arc and track resistance and to help lower the coefficient of linear thermal expansion (C.L.T.E.) of the cured casting composition is a combination of fused silica (C.L.T.E. = $0.5 \times 10^{-6}$ in./in./° C) and alumina trihydrate (C.L.T.E. = $5.5 \times 10^{-6}$ in./in./° C). Silica is subject to attack by arced $SF_6$, because it reacts with hydrogen fluoride, an ingredient of arced $SF_6$ mixtures, to form the gas $SiF_4$ and a mixture of fluorine and oxygen containing solid reaction products. Silica would generally be expected to be unsuitable as a filler in $SF_6$ insulated high voltage transmission systems. However, we found that its combination, within a particular critical weight ratio, with alumina trihydrate, provides a very effective arced $SF_6$ resistant composition, with the important benefit of a low coefficient of linear thermal expansion.

An electric arc causes degradation of sulfur hexafluoride gas into chemical entities that are extremely reactive, including gaseous elementary fluorine which may be ionized. These chemical entities are capable of abstracting hydrogen from molecules having O—H or even C—H bonds, to form hydrogen fluoride, which is extremely reactive with many insulating materials. The term "resistant to arced $SF_6$ gas" as used herein, means that these cured compositions resist chemical attack along or upon their surfaces by these chemical entities formed by the electric arc degradation of sulfur hexafluoride gas, and retain their insulating characteristics. They especially resist the formation of a low-resistance track of carbon on their surfaces.

In the composition of this invention the weight ratio of fused silica:alumina trihydrate is between about 0.75 to about 3.5:1 i.e. about 0.75 to 3.5 parts by weight silica for each 1 part by weight of alumina trihydrate. Both fillers must be present. This provides cured casting compositions having coefficients of linear thermal expansion of below about $38 \times 10^{-6}$ in./in./° C, generally between about $20 \times 10^{-6}$ to $38 \times 10^{-6}$ in./in./° C.

This range provides excellent matching between the thermal expansion of the insulating composition and the copper, or aluminum component which it contacts. This range also provides a good match between any contacting composite electrically conducting coils of copper or aluminum overcoated with an insulator such as paper or a resinous enamel, or their combination, which have a composite coefficient of linear thermal expansion of about $30 \times 10^{-6}$ in./in./° C. Thus, under thermal cycling, the main cause of insulation cracking and separation is eliminated.

Greater than about 3.5 parts silica per part alumina trihydrate and the composition would be subject to excessive chemical attack and degradation in the presence of arced $SF_6$. Less than 0.75 part silica per part alumina trihydrate and the composition would have a coefficient of linear thermal expansion over about $38 \times 10^{-6}$ in./in./° C and would be mismatched when applied to or when contacting copper or aluminum surfaces subject to thermal cycling.

The average particle size range of the fillers can vary between about 0.10 micron to about 75 microns. Under 0.10 micron and the composition will be too viscous to pour. Over 75 microns and problems of poor particle suspension and each of homogeneity in the cured insulation occur. The preferred average particle size is between about 1 micron to about 25 microns.

In this invention the cured casting composition comprises the cured admixture of: (1) 100 parts of hydantoin epoxy resin, (2) about 75 parts to about 110 parts of anhydride curing agent, (3) about 0.04 part to about 1.5 parts of a promoter effective to accelerate the cure between the epoxy and the anhydride, (4) about 100 parts to about 450 parts of fused silica and (5) about 75 parts to about 275 parts of alumina trihydrate. In order to be useful as a casting composition the admixture must have a viscosity of between about 1,000 cps. to about 20,000 cps. at a pouring temperature of about 100° C.

EXAMPLE 1

Three silica:alumina trihydrate-hydantoin epoxy casting compositions were made by: (1) dry blending the fused silica and alumina trihydrate, (2) heating the filler blend to 125° C and the resin and anhydride to 80° C, and then (3) mixing these heated ingredients with the promoter at 100° C, in an air driven mixer for 10 minutes, until the mixture was homogeneous. This mixture was then placed in a vacuum tank, at 2 mm. mercury maximum, for 10 minutes, to eliminate substantially all of the air bubbles caused by the mixing. The viscosity of the three casting compositions was between 4,000 cps. to 19,500 cps. at 100° C, as measured by a Brookfield viscometer.

The hot, substantially bubble free casting compositions were then poured into molds preheated at 100° C and having cavities 2 inches dia. × 8 inches deep. These molds were placed in an oven at 100° C, and the filled epoxy compositions were allowed to cure at that temperature for 6 hours. The castings were then removed from the mold and postcured in an oven at 150° C for an additional 6 hours. The castings were then cut into 1 inch thick discs for testing. The hot casting compositions were also poured into ⅛ inch thick cavities between glass plates sealed with silicone gaskets, to provide 6 inch long, 6 inch wide, ⅛ inch thick samples. These samples were also cured and postcured as described above.

Evaluation of these cured casting composition samples included a dry arc resistance test on the ⅛ inch thick slab samples, (ASTM D-495). This test was used as a screening test for the very expensive $SF_6$ tests. Values over 235 were considered very good. Values below 215 generally assured failure on the $SF_6$ tests. The pressurized $SF_6$ impulse flashover deterioration test, was conducted on 1 inch thick disc samples in $SF_6$ gas, at about 45 psig. In this pressurized $SF_6$ test, the discs were sandwiched between electrodes and placed in an enclosure with the pressurized $SF_6$ gas at a temperature of about 20° C. The electrodes, which were 4 inches O.D. × 0.5 inches rounded edges, were mounted directly to oppsite sides of the disc with silicone grease. A 0.050 inch diameter Tungsten wire was inserted into a hole drilled into the side of each specimen. The function of the Tungsten wire was to provide a means of initiating and controlling the location of each voltage flashover. The Tungsten wire was connected to the ground potential electrode. The strike distance between the upper electrode and the top of the wire was about 0.9 inches.

Five successive AC voltage (60 Hz) flashover levels were measured on the test specimen before it was subjected to an impulse flashover. The AC voltage was increased at the rate of rise of about 2 kV/sec. until specimen flashover was observed. The magnitude of the AC flashover voltage was then recorded. The high voltage AC supply, a high internal impedance supply (180 k ohms) limited the AC flashover current to a level were only very light tracking resulted on the specimen surface. Following the AC flashover measurements, the specimen was subjected to a high energy impulse flashover. Immediately following the impulse flashover, five successive AC flashover voltage levels were measured and the comparison of these values were used as a measure of the amount of specimen surface degradation that occurred due to the high energy impulse.

Specimens were then rated by the % change in the AC flashover voltage (r.m.s.) range from the initial maximum value, which was generally between about 185 to 235, to the final lower value. A % change below 60% was rated very good; a change between 60 to 150% was rated good, a change over 150% was rated fair, and a change of over 250 was rated poor. The total energy impulse was a minimum of about 400 kilojoules/impulse. The performance criterion is deterioration of AC flashover values which relates to withstanding the arched $SF_6$ gas without serious carbon tracking or other chemical or electrical degradation or shattering.

The most common mode of failure was due to excessive buildup of carbon on the specimens. Here, the failure was due directly to the carbon buildup reaching a level that caused the tracking resistance to decrease to a level where it was impossible to elevate the AC voltage across the sample without causing a rapid increase in the AC current. The increase in AC current generally resulted in the observable burning of the carbon track. A less frequent mode of failure was internal breakdown of the specimen material which in some cases caused the specimens to split apart.

Thermal expansion coefficients and heat distortion temperatures were measured with a DuPont Thermal Mechanical Analyzer, Model No. 941, equipped with a No. 900 console. The results of these tests on three cured samples having a composition within this invention are given below in Table 1.

TABLE 1

| | | | |
|---|---|---|---|
| Hydantoin Epoxy | 100 parts | 100 parts | 100 parts |
| Hexahydrophthalic Anhydride | 93 parts | 93 parts | 93 parts |
| Dimethyl amino methyl phenol | 0.2 part | 0.2 part | — |
| 2-methylimidazole | — | — | 0.05 part |
| Fused silica | 331 parts | 179 parts | 381 parts |
| Alumina Trihydrate | 142 parts | 179 parts | 142 parts |
| Test:ASTM D-495 | 243 sec. | 295 sec. | 238 sec. |
| Pressurized $SF_6$ | 68% change | 69% change | 55% change |
| Arc Test | Good | Good | Very Good |
| Heat Distortion Temp., °C | — | — | 125° C |
| C.L.T.E. × $10^{-6}$ in./in./° C | 30 | 37 | 23 |

The cured epoxy resin was a mixture of 70 parts of a liquid hydantoin epoxy resin having an epoxy equivalent weight of 155 to 190, and a viscosity at 25° C of about 1,000 cps to 2,500 cps., and 30 parts of a liquid hydantoin epoxy resin having an epoxy equivalent weight of 130 to 145, and a viscosity at 25° C of about 1,500 cps. to 2,500 cps. (both sold commercially by Ciba-Geigy Co. under the respective tradenames ARACAST XB-2869 and ARACAST XB-2793). The average particle size of the fillers was between about 5 to 10 microns.

As can be seen, the C.L.T.E. values are good, and the $SF_6$ test provided particularly good results for the high silica sample. The weight ratio of fused silica:aluminum trihydrate varied from 1 to 2.7:1.

These fluid compositions were cast and cured for used as spacers to insulate aluminum conductors from the walls of pressurized ducts in $SF_6$ gas insulated transmission lines. These insulating spacers were found to be a very effective insulation with a low C.L.T.E. and extraordinary $SF_6$ arc resistance.

EXAMPLE 2

As a comparative example, two silica:alumina trihydrate-cycloaliphatic epoxy casting compositions were made using the same procedure as in Example 1, to give casting compositions having viscosities of between about 3,000 cps. to 9,000 cps. at 90° C. These compositions were molded into 2 inch dia. × 8 inch deep castings and ⅛ inch thick samples, and cured for 6 hours at 100° C followed by a postcure at 150° C for an additional 6 hours, as described in EXAMPLE 1. The epoxy resin used in this case, was a mixture of 55 parts of 3,4-epoxy cyclohexylmethyl-3,4-epoxy cyclohexane carboxylate cycloaliphatic epoxy resin, having an epoxy equivalent weight of 133 and a viscosity at 25° C of 350 cps. to 450 cps. and 45 parts of a flexibilized cycloaliphatic epoxy resin, having an epoxy equivalent weight of 390-430 and a viscosity at 40° C of about 450 cps. (both sold commercially by Union Carbide Co. as ERL-4221 and ERRA-4090). In this case 0.75 parts of N,N-dimethylbenzylamine was used as the cure promoter. The results of tests, using the same procedures as in EXAMPLE 1, are given below in Table 2.

TABLE 2

| Cycloaliphatic Epoxy | 100 parts | 100 parts |
|---|---|---|
| Hexahydrophthalic Anhydride | 70 parts | 70 parts |
| N,N-dimethylbenzylamine | 0.75 part | 0.75 part |
| Fused Silica | 291 parts | 158 parts |
| Alumina Trihydrate | 125 parts | 158 parts |
| Test:ASTM D-495 | 228 sec. | 300 sec. |
| Pressurized $SF_6$ Arc Test | 85% change Good | 154% change Fair |
| Heat Distortion Temp., ° C | 125° C | 125° C |
| C.L.T.E. $\times 10^{-6}$ in./in./° C | 51 | 59 |

The cycloaliphatic resin systems, while exhibiting good dry arc resistance and fair to good pressurized $SF_6$ arc resistance, has relatively high coefficients of linear thermal expansion. These high C.L.T.E. values might cause cracking and eventual failure upon thermal cycling, when used in contact with copper or aluminum. From comparison with EXAMPLE 1, it would seem that the combination of the hydantoin epoxy with the combination filler system is necessary to provide a cured casting composition having both resistance to arced $SF_6$ and a low C.L.T.E.

Two bisphenol A samples were also made, as a comparative example, using the same procedure as in EXAMPLE 1, to give casting compositions having viscosities of between about 7,800 cps. to 33,000 cps. at 100° C. These compositions were molded into 2 inch dia. × 8 inch deep castings and ⅛ inch thick samples and cured for 6 hours at 700° C followed by a post cure at 150° C for an additional 6 hours, as described in EXAMPLE 1. All of these samples contained a liquid diglycidyl ether of bisphenol A resin, having an epoxy equivalent weight of 186–192 and a viscosity of between 11,000 to 14,000 cps. at 25° C (sold commercially by Dow Chemical Co. under the trade name DER 331). The results of tests, using the same procedures as in EXAMPLE 1, are given below in Table 3.

TABLE 3

| Bisphenol Epoxy | 100 parts | 100 parts |
|---|---|---|
| Hexahydrophthalic Anhydride | 80 parts | 80 parts |
| 2-Methylimidazole | 0.08 part | 0.08 part |
| Fused Silica | 305 parts | — |
| Alumina Trihydrate | 130 parts | 411 parts |
| Test:ASTM D-495 | 192 sec. | 197 sec. |
| Pressurized $SF_6$ Arc Test | — | 379% Change Poor |
| Heat Distortion Temp., ° C | — | 143 |
| C.L.T.E. $\times 10^{-6}$ in./in./° C | 30 | 43 |

Here, both samples did so poorly on the ASTM dry arc test, that only one sample was tested in the pressurized $SF_6$ test. The $SF_6$ tested sample essentially failed the test providing extremely high % change values.

Three further comparative examples were made using the same procedure as in EXAMPLE 1, to give casting compositions having viscosities of between about 4,000 cps. to 10,000 cps. at 100° C. These compositions were molded into 2 inch dia. × 8 inch deep castings and ⅛ inch thick samples and cured for 6 hours at 100° C followed by a post cure at 150° C for an additional 6 hours, as described in EXAMPLE 1. All of these samples contained ARACAST XB-2869 (described in EXAMPLE 1) as the sole hydantoin epoxy resin. Two samples contained all fused silica filler and the other sample contained all alumina trihydrate filler. The results of tests, using the same procedures as in EXAMPLE 1, are given below in Table 4.

TABLE 4

| Hydantoin Epoxy | 100 parts | 100 parts | 100 parts |
|---|---|---|---|
| Hexahydrophthalic Anhydride | 86 parts | 86 parts | 86 parts |
| N,N dimethylbenzylamine | 1 part | — | — |
| Dimethyl Amine Methyl Phenol | — | 0.2 part | 0.2 part |
| Fused Silica | 490 parts | 490 parts | — |
| Alumina Trihydrate | — | — | 317 parts |
| Test:ASTM D-495 | 195 sec. | 198 sec. | 420 sec. |
| Pressurized $SF_6$ Arc Test | Split Apart | — | 180% change Fair |
| Heat Distortion Temp., ° C | — | 106 | 111 |
| C.L.T.E. $\times 10^{-6}$ in./in./° C | — | 22 | 43 |

The all silica-hydantoin system while exhibiting very low C.L.T.E. values, did very poorly on the dry arc resistance test split on the pressurized $SF_6$ test and had a low heat distortion temperature. The all alumina trihydrate-hydantoin system showed outstanding dry arc resistance but had a high C.L.T.E. value.

We claim:

1. An electrical article comprising a metal conductor and a container, cured, insulating body produced by curing the admixture consisting essentially of:
    (A) 100 parts of hydantoin epoxy resin;
    (B) about 75 parts to about 110 parts of anhydride curing agent;
    (C) about 0.04 part to about 1.5 parts of a cure promoter;
    (D) about 100 parts to about 450 parts of fused silica; and
    (E) about 75 parts to about 275 parts of alumina trihydrate; wherein the weight ratio of fused silica:alumina trihydrate is between about 0.75:1 to about 3.5:1; said cured insulating body characterized by being resistant to arced $SF_6$ gas and having a coefficient of linear thermal expansion of up to about $38 \times 10^{-6}$ in./in./° C.

2. The electrical article of claim 1, wherein the anhydride is an organic carboxylic acid anhydride, the cure promoter is selected from the group consisting of organic amines and quaternary phosphonium compounds and the metal conductor is selected from the group consisting of copper and aluminum.

3. The electrical article of claim 1, wherein the average particle size of the fused silica and the alumina trihydrate is between about 0.10 micron to about 75 microns.

4. The electrical article of claim 3, wherein the hydantoin epoxy resin is characterized by an epoxy equivalent weight of between about 100 to about 500.

5. The electrical article of claim 3, wherein the anhydride is a di-functional anhydride selected from the group consisting of hexahydrophthalic anhydride, tetrahydrophthalic anhydride, 1-methyltetrahydrophthalic anhydride, NADIC methyl anhydride, dodecenyl succinic anhydride and mixtures thereof.

6. The electrical article of claim 3, wherein the insulating body is in contact with electrically conducting coils selected from the group consisting of copper and aluminum overcoated with an insulator selected from the group consisting of paper, resinous enamel and their combination.

7. The electrical article of claim 3, wherein the insulating body is an insulating spacer in contact with conductors selected from the group consisting of copper and aluminum, in a pressurized SF$_6$ gas insulated high voltage transmission system.

8. An electrical article comprising a metal conductor and a contacting, cured, insulating body produced by curing the admixture consisting of:
   (A) 100 parts by hydantoin epoxy resin having an epoxy equivalent weight of between about 100 to about 500;
   (B) about 75 parts to about 110 parts of an organic carboxylic acid anhydride reactive with the epoxy resin;
   (C) about 0.04 part to about 1.5 parts of an amine cure promoter selected from the group consisting of organic aliphatic amines, organic aromatic amines, imidazole amines and mixtures thereof;
   (D) about 100 parts to about 450 parts of fused silica having an average particle size of between about 0.10 micron to about 75 microns;
   (E) about 75 parts to about 275 parts of alumina trihydrate having an average particle size of between about 0.10 micron to about 75 microns; wherein the weight ratio of fused silica:alumina trihydrate is between about 0.75:1 to about 3.5:1; said cured casting composition characterized by being resistant to arced SF$_6$ gas and having a coefficient of linear thermal expansion of up to about $38 \times 10^{-6}$ in./in./° C.

9. The electrical article of claim 8, wherein the anhydride is hexahydrophthalic anhydride.

10. The electrical article of claim 8, wherein the insulating body is an insulating spacer in contact with conductors selected from the group consisting of copper and aluminum, in pressurized SF$_6$ gas insulated high voltage equipment.